United States Patent
Kim et al.

(10) Patent No.: US 10,326,307 B2
(45) Date of Patent: Jun. 18, 2019

(54) ELECTRONIC APPARATUS AND OPERATING METHOD THEREOF

(71) Applicant: Samsung Electronics Co., Ltd., Suwon-si, Gyeonggi-do (KR)

(72) Inventors: Yusu Kim, Yongin-si (KR); Kwangseob Kim, Suwon-si (KR); Dongzo Kim, Yongin-si (KR); Seho Park, Yongin-si (KR); Hanseok Park, Seoul (KR); Keumsu Song, Seoul (KR); Ju-Hyang Lee, Suwon-si (KR); Mincheol Ha, Suwon-si (KR); Seung-Nyun Kim, Incheon (KR); Yong Sang Yun, Osan-si (KR); Chi-Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 15/413,916

(22) Filed: Jan. 24, 2017

(65) Prior Publication Data

US 2017/0271920 A1 Sep. 21, 2017

(30) Foreign Application Priority Data

Mar. 17, 2016 (KR) .................. 10-2016-0031771

(51) Int. Cl.
*H02J 50/10* (2016.01)
*H02H 7/20* (2006.01)
*H02J 50/12* (2016.01)
*H02J 7/02* (2016.01)
*H02J 7/34* (2006.01)

(52) U.S. Cl.
CPC ............... *H02J 50/10* (2016.02); *H02H 7/20* (2013.01); *H02J 7/025* (2013.01); *H02J 50/12* (2016.02); *H02J 7/345* (2013.01)

(58) Field of Classification Search
CPC .. H02J 7/025; H02J 7/345; H02J 50/10; H02J 50/12; H02H 7/20
USPC ........................................... 307/104
See application file for complete search history.

(56) References Cited

U.S. PATENT DOCUMENTS

| | | | | |
|---|---|---|---|---|
| 9,509,169 B2* | 11/2016 | Park | ........................ | H02J 7/025 |
| 9,577,460 B2* | 2/2017 | Park | ........................ | H02J 7/025 |
| 9,917,467 B2* | 3/2018 | Jeong | ...................... | H02J 17/00 |
| 2015/0115878 A1 | 4/2015 | Park | | |
| 2015/0115879 A1 | 4/2015 | Park | | |
| 2015/0180264 A1 | 6/2015 | McFarthing | | |
| 2016/0079764 A1* | 3/2016 | Cho | ........................ | H02J 50/80 |
| | | | | 307/104 |

FOREIGN PATENT DOCUMENTS

| | | |
|---|---|---|
| DE | 10 2014 012 613 A1 | 6/2015 |
| EP | 2 940 830 A2 | 11/2015 |
| GB | 2521492 A | 6/2015 |

* cited by examiner

*Primary Examiner* — Hal Kaplan
(74) *Attorney, Agent, or Firm* — Jefferson IP Law, LLP

(57) ABSTRACT

An electronic apparatus and its operating method are provided. The electronic apparatus and its operating method can be configured to drive the capacitor, to detect the received power, and stop driving the capacitor.

20 Claims, 12 Drawing Sheets

ELECTRONIC APPARATUS AND OPERATING METHOD THEREOF

CROSS-REFERENCE TO RELATED APPLICATION(S)

The present application claims the benefit under 35 U.S.C. § 119(a) of a Korean patent application filed on Mar. 17, 2016, in the Korean Intellectual Property Office and assigned Serial No. 10-2016-0031771, the entire disclosure of which is hereby incorporated by reference.

TECHNICAL FIELD

The present disclosure relates to an electronic device and an operating method thereof. More particularly, the present disclosure relates to an electronic device for wirelessly receiving power and an operating method thereof.

BACKGROUND

As technologies advance, various functions are added to an electronic device. For example, the electronic device can wirelessly receive power. The electronic device can receive the power using a magnetic field. The electronic device can perform short-range communication. The electronic device can fulfill the short-range communication using a magnetic field. For doing so, the electronic device can include a plurality of modules and a plurality of coils. Herein, each individual module can correspond to each individual coil.

However, such an electronic device requires a space to mount the modules and the coils. As the modules and the coils increase in number, the space for mounting the modules and coils can expand in the electronic device. In addition, mounting the modules and the coils in the electronic device incurs a material cost. As the modules and the coils increase in number, the material cost for mounting the modules and coils can rise.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus of an electronic device include at least one antenna for wirelessly receiving power, a controller for controlling the power, and at least one capacitor for protecting the controller from the power. The controller can drive the capacitor, detect the power received via the antenna, and stop driving the capacitor.

In accordance with an aspect of the present disclosure, an operating method of an electronic device which comprises a capacitor for protecting an internal circuit from power received, can include driving the capacitor, detecting the received power, and stopping driving the capacitor.

In accordance with another aspect of the present disclosure, a computer-readable recording medium can record a program for driving a capacitor to protect an internal circuit, detecting power received, and stopping driving the capacitor.

For an external device to detect the electronic device, the electronic device can use the capacitor for protecting its internal circuit. The electronic device can utilize a single coil for both of wireless charging and magnetic field communication. Hence, the plurality of the wireless charging methods or the wireless charging method and the magnetic field communication method can be used together in the electronic device. Therefore, a space for the module or the coil can be reduced in the electron device and a material cost can be lowered.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components and structures.

DETAILED DESCRIPTION

Figure 1:
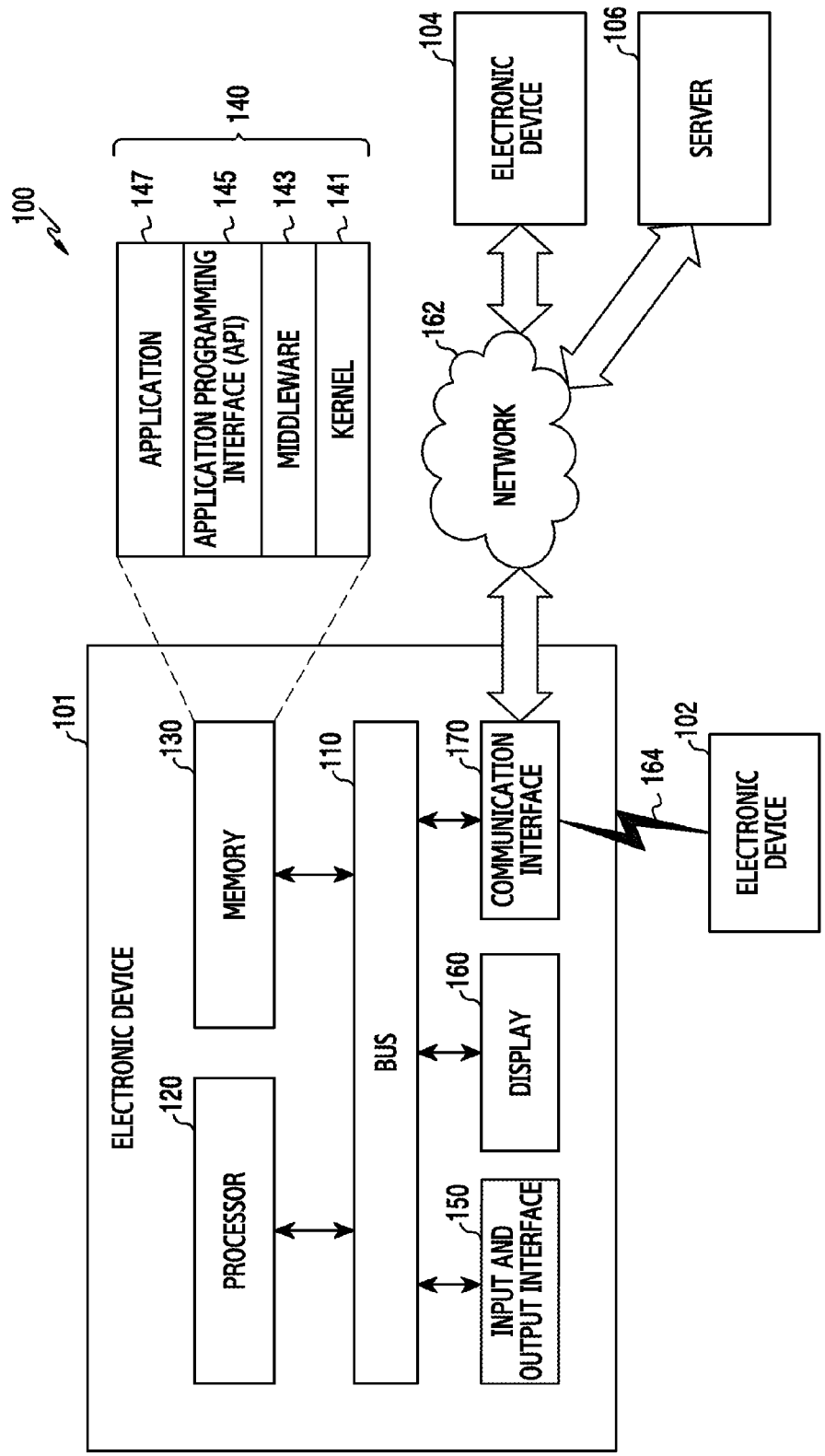
FIG. 1 is a block diagram of a network environment system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items.

Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a central processing unit (CPU) or an application processor) that can perform a corresponding operation by executing at least one software program stored at an exclusive processor (such as an embedded processor) for performing a corresponding operation or at a memory device.

An electronic device according to embodiments of the present disclosure, may be embodied as, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an Moving Picture Experts Group phase 1 or phase 2 (MPEG1 or MPEG-2) audio layer 3 (MP3) player, a medical equipment, a camera, and a wearable device. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), and an implantable circuit. The electronic device may be embodied as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (such as, a navigation device for ship and gyro compass), avionics, a security device, a head unit for a vehicle, an industrial or home robot, a drone, an automated teller machine (ATM) of a financial institution, a point of sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user," as used herein, can refer to a person using an electronic device or a device using an electronic device (e.g., an artificial intelligence electronic device).

FIG. 1 is a block diagram of a network environment system according to an embodiment of the present disclosure.

Referring to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a communication processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an application programming interface (API) 145, and/or an application program (or "application") 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a liquid crystal display (LCD), a light emitting diode (LED) display, an organic light emitting diode (OLED) display, a microelectromechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 or through wireless communication or wired communication 164.

The wireless communication, for example, can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication can include, for example, at least one of Wi-Fi, Bluetooth (BT), Bluetooth low energy (BLE), Zigbee, near field communication (NFC), magnetic secure transmission, radio frequency (RF), and body area network (BAN). The wireless communication can include GNSS. The GNSS can include, for example, global positioning system (GPS), global navigation satellite system (GLONASS), Beidou navigation satellite system (Beidou), or Galileo (the European global satellite-based navigation system). Hereafter, the GPS can be interchangeably used with the GNSS. The wired communication, for example, can include at least one of universal serial bus (USB), high definition multimedia interface (HDMI), recommended standard 232 (RS-232), power line communications, and plain old telephone service (POTS). The network 162 can include a telecommunications network, for example, at least one of computer network (e.g., local area network (LAN) or wide area network (WAN)), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
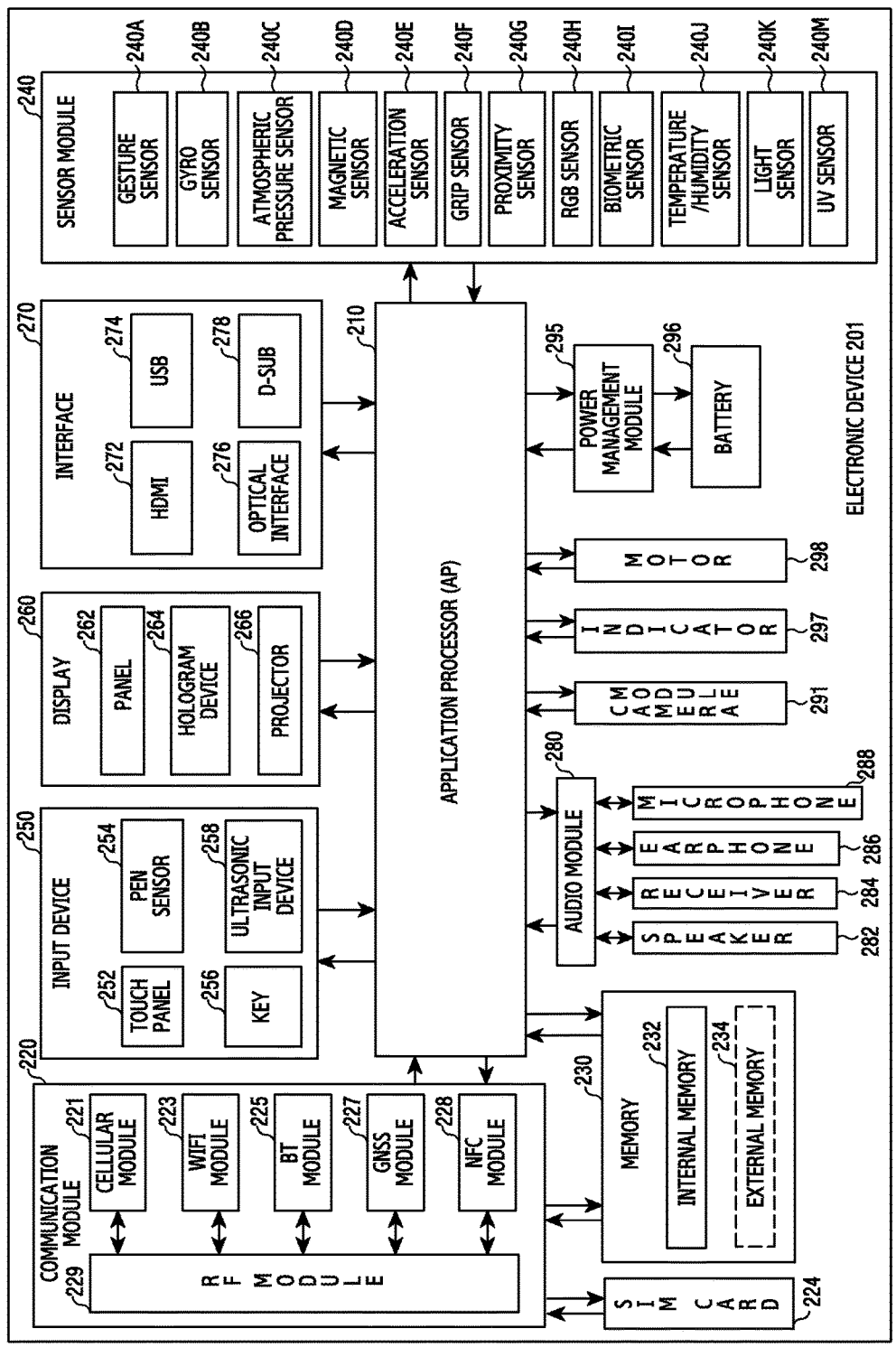
FIG. 2 is a block diagram of an electronic device according to an embodiment of the present disclosure.

FIG. 2 is a block diagram of an electronic device according to an embodiment of the present disclosure. The electronic device 201, for example, can include all or part of the above-described electronic device 101 of FIG. 1.

Referring to FIG. 2, the electronic device 201 includes one or more processors (e.g., an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a system on chip (SoC), for example. The processor 210 can further include a graphic processing unit (GPU) and/or an image signal processor. The processor 210 may include at least a part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a Wi-Fi module 223, a BT module 225, a GNSS module 227, an NFC module 228, and an RF module 229. The cellular module 221, for example, can provide voice call, video call, short message service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the Wi-Fi module 223, the BT module 225, the GNSS module 227, and the NFC module 228 can be included in one integrated circuit (IC) or an IC package. The RF module 229, for example, can transmit/receive a communication signal (e.g., an RF signal). The RF module 229, for example, can include a transceiver, a power amplifier module (PAM), a frequency filter, a low noise amplifier (LNA), or an antenna. According to another embodiment, at least one of the cellular module 221, the Wi-Fi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an integrated circuit card identifier (ICCID)) or subscriber information (e.g., an international mobile subscriber identity (IMSI)).

The memory 230 (e.g., the memory 130) can include at least one of an internal memory 232 and an external memory 234. The internal memory 232 can include at least one of, for example, a volatile memory (e.g., dynamic RAM (DRAM), static RAM (SRAM), or synchronous dynamic RAM (SDRAM)), and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory, hard drive, and solid state drive (SSD)). The external memory 234 can include flash drive, for example, compact flash (CF), secure digital (SD), micro SD, mini SD, extreme digital (xD), multi-media card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a bio sensor 240I, a temperature/humidity sensor 240J, an illumination sensor 240K, and an ultra violet (UV) sensor 240M. Additionally or alternately, the sensor module 240 can include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a d-subminiature (D-sub) 278. The interface 270 can be included in, for example, the communication interface 170 of FIG. 1. Additionally or alternatively, the interface 270 can include a mobile high-definition link (MHL) interface, a SD card/MMC interface, or an infrared data association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an image signal processor (ISP), or a flash (e.g., an LED or a xenon lamp). The power management module 295, for example, can manage the power of the electronic device 201. According to an embodiment of the present disclosure, the power management module 295 can include a power management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as digital multimedia broadcasting (DMB), digital video broadcasting (DVB), or Media-FLOW™. Each of the above-described components of the electronic device can be configured with at least one component and the name of a corresponding component can vary according to the kind of an electronic device.

According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
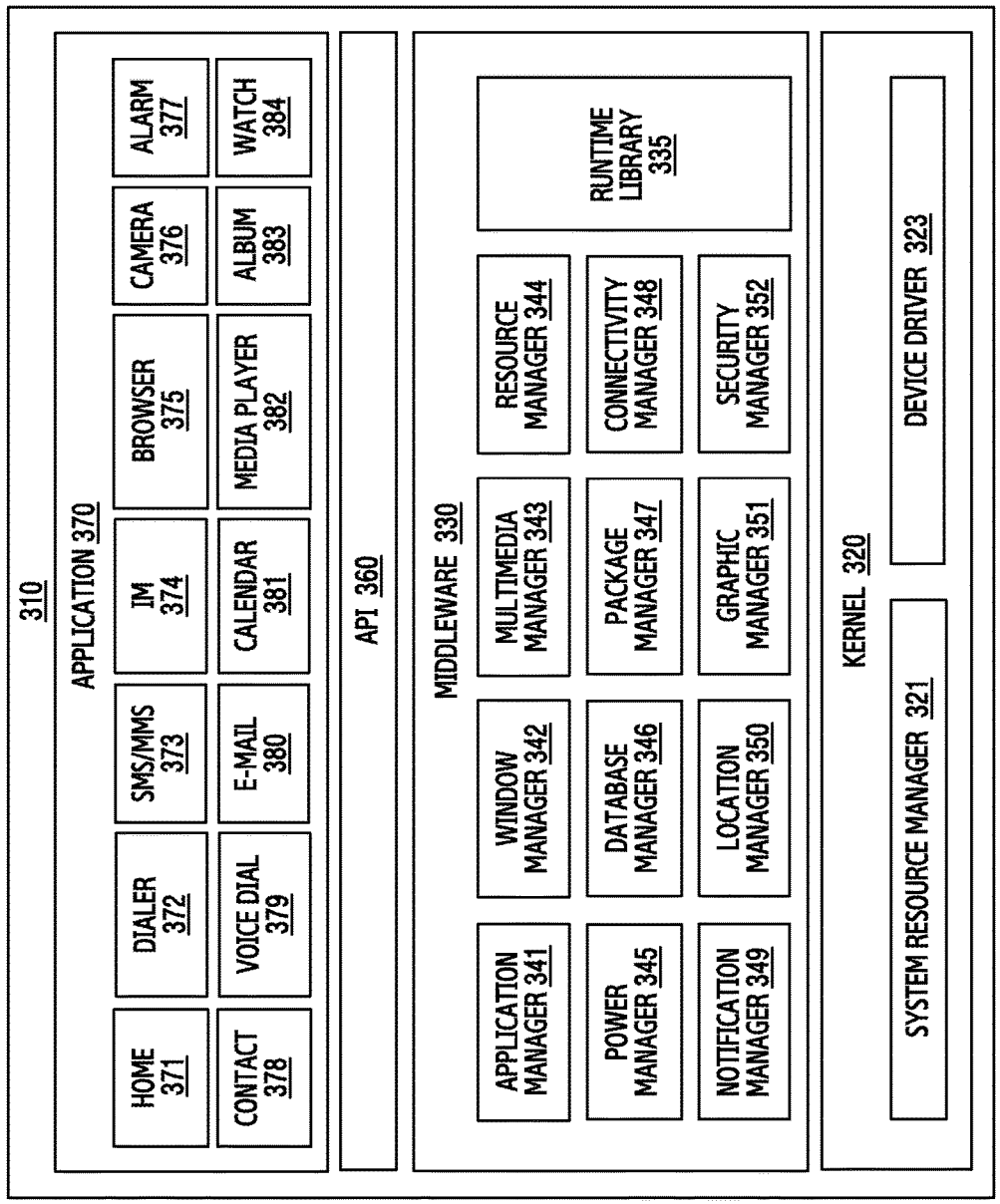
FIG. 3 is a block diagram of a program module according to an embodiment of the present disclosure.

FIG. 3 is a block diagram of a program module according to an embodiment of the present disclosure.

Referring to FIG. 3, a program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. As illustrated in FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The device driver 323 can include, for example, a display driver, a camera driver, a Bluetooth driver, a sharing memory driver, a USB driver, a keypad driver, a Wi-Fi driver, an audio driver, or an inter-process communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 370 or a memory space. The power manager 345 can manage the capacity or power of the battery and provide power information for an operation of the electronic device. The power manager 345 can operate together with a basic input/output system (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iOS can provide one API set for each platform, and Tizen can provide two or more API sets for each platform.

The application 370 can include at least one of a home 371, a dialer 372, an SMS/multimedia messaging system (MMS) 373, an instant message (IM) 374, a browser 375, a camera 376, an alarm 377, a contact 378, a voice dial 379, an e-mail 380, a calendar 381, a media player 382, an album 383, a clock (i.e., watch) 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. At least part of the program module 310 can be implemented (e.g., executed) with software, firmware, hardware (e.g., the processor 210), or a combination of at least two of them, and include a module, a program, a routine, a set of instructions, or a process for executing one or more functions.

The term "module," as used herein, can imply a unit including hardware, software, and firmware, or any suitable combination. The term "module" can be interchangeably used with terms such as "unit," "logic," "logical block," "component," "circuit," and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an application-specific integrated circuit (ASIC) chip, a field-programmable gate arrays (FPGAs), and a programmable-logic device, which are known or will be developed and which perform certain operations.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a compact disc-ROM (CD-ROM) or a DVD, a magnetic-optic medium (e.g., a floptical disc)), and an internal memory. The instruction can include code created by a compiler or code executable by an interpreter.

The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Figure 4:
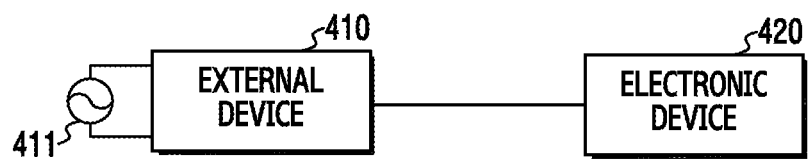
FIG. 4 is a block diagram of a system according to an embodiment of the present disclosure.

FIG. 4 is a block diagram of a system according to an embodiment of the present disclosure.

Referring to FIG. 4, the system 400 can include an external device 410 and an electronic device 420.

The external device 410 can interface using a magnetic field. The external device 410 can wirelessly transmit power. For doing so, the external device 410 can be connected to a power source 411 and receive power from the power source 411. For example, the external device 410 can send an alternating current power. In so doing, the external device 410 can send the power using a wireless power protocol. The external device 410 can transfer power according to at least one wireless charging method. For example, the wireless charging method can include at least one of an electromagnetic induction method, a magnetic resonance method, and an RF/microwave radiation method. The external device 410 can conduct a communication using a magnetic field according to a short-range communication method. For example, the short-range communication method can at least one of NFC and magnetic secure transmission (MST).

The electronic device 420 can perform interfacing using a magnetic field. The electronic device 420 can wirelessly transfer power. For example, the electronic device 420 can receive alternating current power. The electronic device 420 can convert the alternating current power to direct current power. In so doing, the electronic device 420 can receive power using a wireless power protocol. The electronic device 420 can receive power according to at least one wireless charging method. For example, the wireless charging method can include at least one of the electromagnetic induction method, the magnetic resonance method, and the RF/microwave radiation method. Thus, the electronic device 420 can drive using the power. The electronic device 420 can perform a communication using a magnetic field according to at least one short-range communication method. For example, the short-range communication method can include at least one of NFC and MST.

For the electronic device 420 to receive power from the external device 410, the wireless charging method of the electronic device 420 should match the wireless charging method of the external device 410. For example, when the wireless charging methods of the external device 410 and the electronic device 420 are the electromagnetic induction method, the external device 410 can transfer power using the electromagnetic induction and the electronic device 420 can receive the power using the electromagnetic induction. Alternatively, when the wireless charging methods of the external device 410 and the electronic device 420 are the magnetic resonance method, the external device 410 can transfer power using the magnetic resonance and the electronic device 420 can receive the power using the magnetic resonance. Alternatively, when the wireless charging methods of the external device 410 and the electronic device 420 are the RF/microwave radiation method, the external device 410 can transfer power using the RF/microwave radiation and the electronic device 420 can receive the power using the RF/microwave radiation.

For the electronic device 420 to communicate with the external device 410 using a magnetic field, the short-range communication method of the electronic device 420 should match the short-range communication method of the external device 410. For example, when the short-range communication method of the external device 410 and the electronic device 420 matches NFC, the external device 410 can communicate with the electronic device 420 using a magnetic field. Alternatively, when the short-range communication method of the external device 410 and the electronic device 420 matches MST, the external device 410 can communicate with the electronic device 420 using a magnetic field.

For the external device 410 and the electronic device 420 to interface using a magnetic field, the electronic device 420 can be disposed to correspond to the external device 410. The electronic device 420 can be disposed within a preset distance from the external device 410. For example, the external device 410 can include a preset interface region. Hence, when the electronic device 420 enters the interface region, the external device 410 can detect the electronic device 420.

Figure 5:
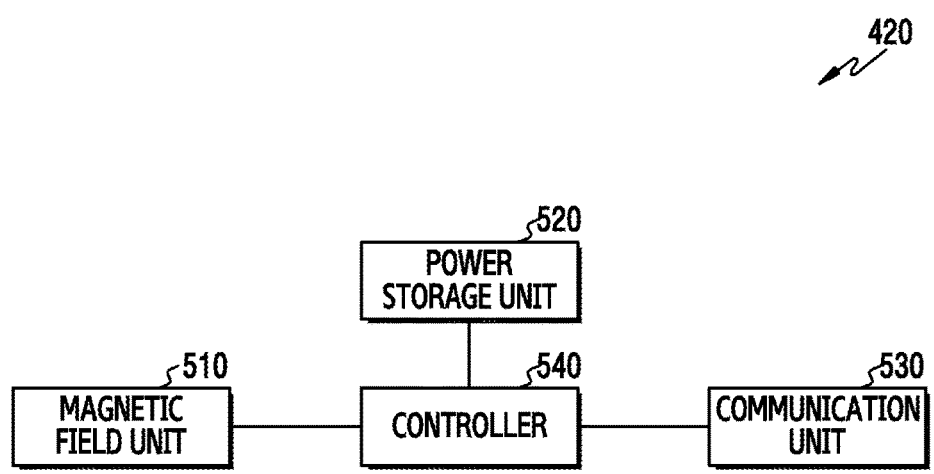
FIG. 5 is a block diagram of an electronic device according to an embodiment of the present disclosure.

FIG. 5 is a block diagram of an electronic device according to an embodiment of the present disclosure.

Referring to FIG. 5, the electronic device 420 can include a magnetic field unit 510, a power storage unit 520, a communication unit 530, and a controller 540.

The magnetic field unit 510 can perform interfacing using a magnetic field in the electronic device 420. The magnetic field unit 510 can wirelessly receive power in the electronic device 420. In so doing, the magnetic field unit 510 can receive the power using at least one wireless charging method. For example, the wireless charging method can include at least one of the electromagnetic induction method, the magnetic resonance method, and the RF/microwave radiation method. The magnetic field unit 510 can receive alternating current power. The magnetic field unit 510 can communicate using a magnetic field. The magnetic field unit 510 can perform the communication using the magnetic field according to at least one short-range communication method. For example, the short-range communication can include at least one of NFC and MST.

The power storage unit 520 can manage the power in the electronic device 420. The power storage unit 520 can store the power. The power storage unit 520 can distribute the power to the components in the electronic device 420. For example, the power storage unit 520 can manage direct current power.

The power storage unit 520 can include a battery and a power manager. The battery can store the power. The power manager can manage the power wirelessly received. The power manager can manage the power stored in the battery. The power manager can supply the power to drive the electronic device 420. For example, the power manager can supply the power to the individual component in the electronic device 420.

The communication unit 530 can perform the communication in the electronic device 420. The communication unit 530 can communicate with an external device 410 in various communication manners. The communication unit 530 can conduct at least one of the wireless communication and the wired communication. For doing so, the communication unit 530 can access at least one of a mobile communication network and a data communication network. Alternatively, the communication unit 530 can perform the short-range communication. The communication unit 530 can include at least one radio antenna. For example, the communication method can include LTE, WCDMA, GSM, Wi-Fi, Bluetooth, BLE, Zigbee, and NFC.

The controller 540 can control the operations in the electronic device 420. The controller 540 can control the components of the electronic device 420. The controller 540 can receive and process the power from the magnetic field unit 510. The controller 540 can supply the power to the power storage unit 520 and the communication unit 530. Using the magnetic field unit 510, the controller 540 can communicate using a magnetic field. The controller 540 can receive and process commands or data from the components of the electronic device 420.

Figure 6:
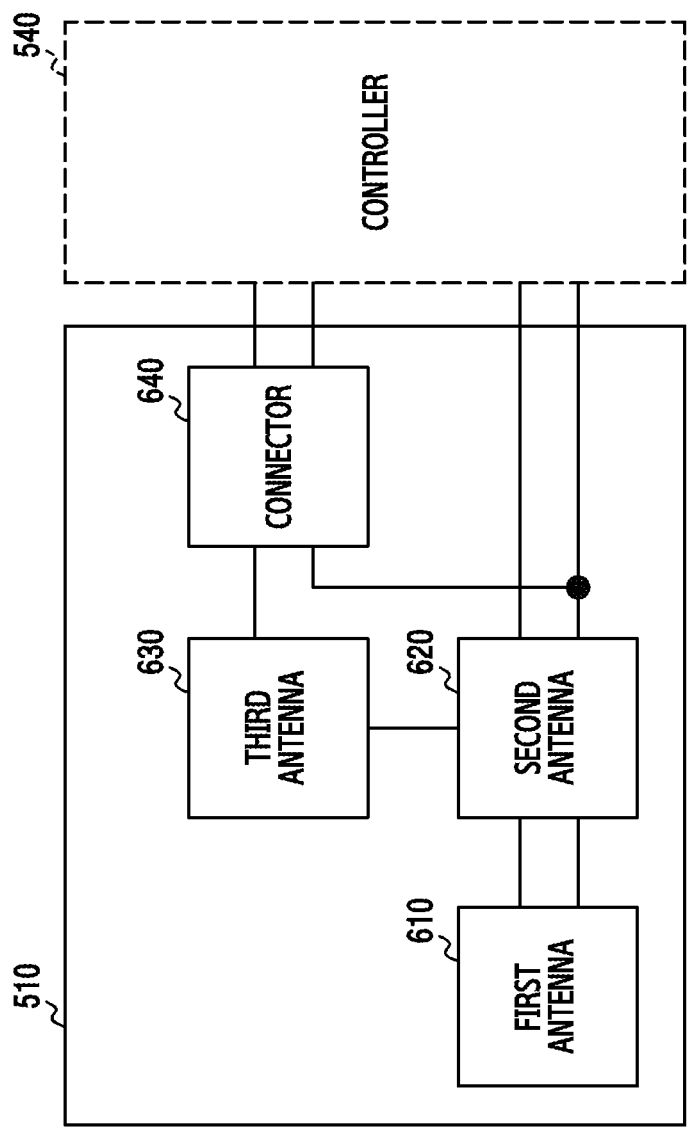
FIG. 6 is a block diagram of a magnetic field unit, such as the magnetic field unit of FIG. 5, according to an embodiment of the present disclosure.

FIG. 6 is a block diagram of a magnetic field unit, such as the magnetic field unit 510 of FIG. 5, according to an embodiment of the present disclosure.

Figure 7:
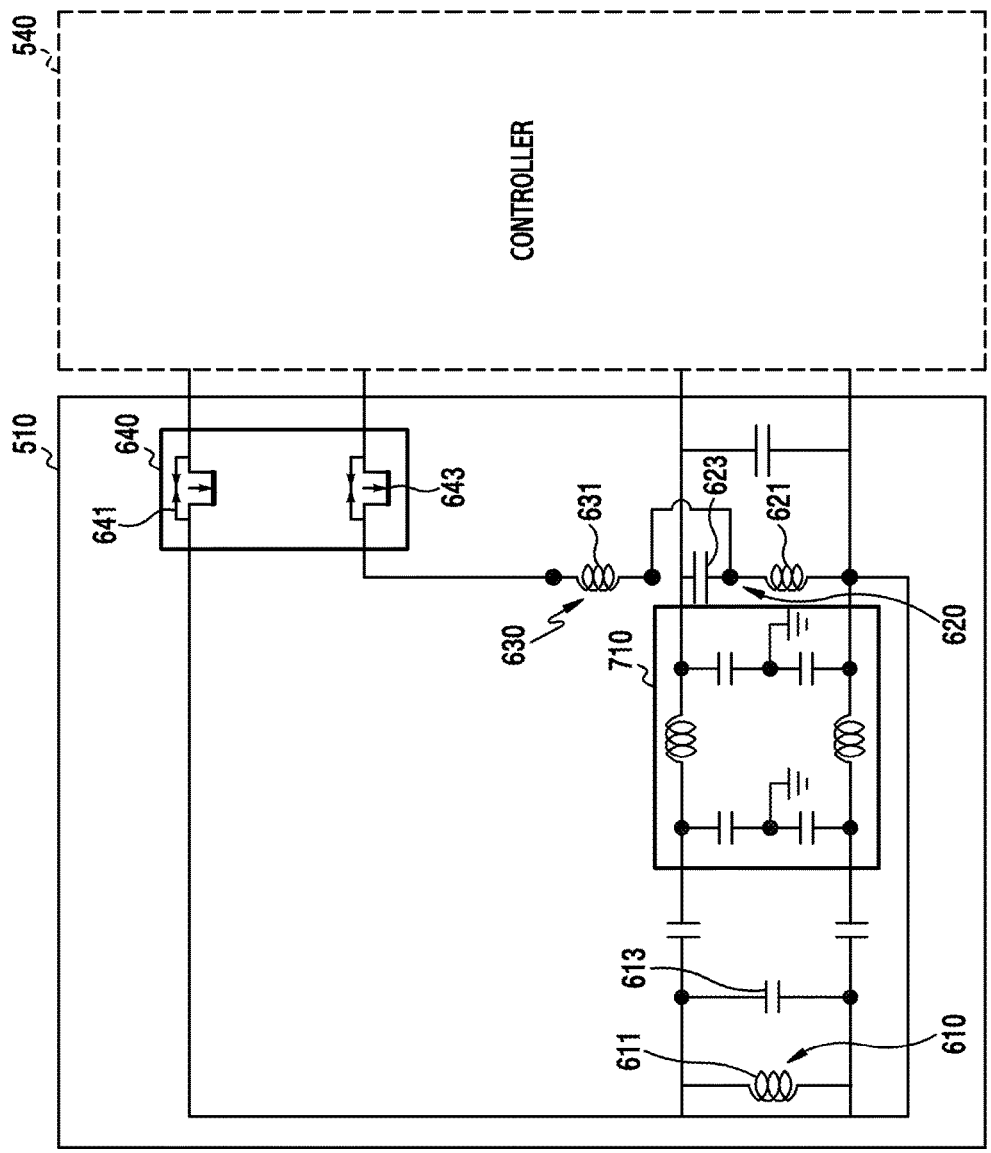
FIG. 7 is a circuit diagram of a magnetic field unit, such as the magnetic field unit of FIG. 5, according to an embodiment of the present disclosure.

FIG. 7 is a circuit diagram of a magnetic field unit, such as the magnetic field unit 510 of FIG. 5, according to an embodiment of the present disclosure.

Referring to FIG. 6, the magnetic field unit 510 can include a first antenna 610, a second antenna 620, a third antenna 630, and a connector 640.

The first antenna 610 can be connected to the controller 540. The first antenna 610 can be driven in response to a high frequency $f_1$. The first antenna 610 can be used in common according to a plurality of magnetic field types. For doing so, the high frequency band $f_1$ can support a first charging method. The first charging method can be the magnetic resonance method.

Referring to FIG. 7, the first antenna 610 can include a first inductor 611 and at least one first capacitor 613. The first inductor 611 can create a magnetic field. The first inductor 611 can include at least one first coil. For example, according to the first charging method, a shape and a size of the first coil can be determined. The first capacitor 613 can be provided for matching between the first inductor 611 and the controller 540. The first capacitor 613 can be provided for impedance matching between the first inductor 611 and the controller 540. For doing so, the first capacitor 613 can be connected to the first inductor 611 in series or in parallel, between the first inductor 611 and the controller 540. For example, the first capacitor 613 can be connected to both ends of the first inductor 611.

For example, the first antenna 610 can be designed according to the high frequency band $f_1$ as shown in Table 1. In the magnetic resonance method, the high frequency band $f_1$ can correspond to 6.78 MHz. An inductance L1 of the first inductor 611 can roughly range from 1.30 μH to 1.65 μH. A capacitance C1 of the first capacitor 613 can be determined by the inductance L1 of the first inductor 611 and the high frequency band $f_1$ based on Equation 1.

$$C1 = \frac{1}{(2\pi f_1)^2 \cdot L1} \qquad \text{Equation 1}$$

The second antenna 620 and the third antenna 630 can be connected to the controller 540. For example, the second antenna 620 and the third antenna 630 can be connected to the first antenna 610 in parallel between the first antenna 610 and the controller 540. The second antenna 620 can drive independently. The second antenna 620 can drive in response to a first low frequency band $f_{21}$. The second antenna 620 and the third antenna 630 can be connected to drive together. The second antenna 620 and the third antenna 630 can drive in response to a second low frequency band $f_{22}$. The second antenna 620 can be used for both of the wireless charging and the short-range communication. For doing so, the first low frequency band $f_{21}$ can support a second charging method, and the second low frequency band $f_{22}$ can support the short-range communication method. The second charging method can be the electromagnetic induction method, and the short-range communication method can be MST. Herein, at least part of the first low frequency band $f_{21}$ and at least part of the second low frequency band $f_{22}$ can overlap in a frequency domain, and the first low frequency band $f_{21}$ and the second low frequency band $f_{22}$ can be separated from each other in the frequency domain.

The second antenna 620 can include a second inductor 621 and a second capacitor 623 as shown in FIG. 7. The second inductor 621 can generate a magnetic field. The second inductor 621 can include at least one second coil. For example, a shape and a size of the second coil can be determined according to the second charging method. The second capacitor 623 can be provided for matching between the second inductor 621 and the controller 540. The second capacitor 623 can be provided for impedance matching between the second inductor 621 and the controller 540. For doing so, the second capacitor 623 can be connected to the second inductor 621 in series, between the second inductor 621 and the controller 540.

For example, the second antenna 620 can be designed according to the first low frequency band $f_{21}$ as shown in Table 1. In the electromagnetic induction method, the first low frequency band $f_{21}$ can correspond to 87 kHz through 500 kHz. The first low frequency band $f_{21}$ can cover 87 kHz through 200 kHz for wireless power consortium (WPC) and frequencies below 500 kHz for power matters alliance (PMA). An inductance L2 of the second inductor 621 can roughly range from 8.40 μH to 9.20 μH. A capacitance C2 of the second capacitor 623 can be determined by the inductance L2 of the second inductor 621 and the first low frequency band $f_{21}$ based on Equation 2.

$$C2 = \frac{1}{(2\pi f_{21})^2 \cdot L2} \qquad \text{Equation 2}$$

The third antenna 630 can include a third inductor 631 as shown in FIG. 7. The third inductor 631 can be connected to the second antenna 620 in series. That is, the third inductor 631 can be connected to the second inductor 621 and the second capacitor 623 in series. The third inductor 631 can generate a magnetic field with the second inductor 621. The third inductor 631 can include at least one third coil. For example, a shape and a size of the third coil can be determined according to the short-range communication method. Further, the shape and the size of the third coil can be determined based on the shape and the size of the second coil.

For example, the third antenna 630 can be designed according to a second low frequency band $f_{22}$ as shown in Table 1. According to MST, the second low frequency band $f_{22}$ can correspond to frequencies below 10 kHz. An inductance L3 of the third inductor 631 can roughly range from 15.70 μH to 18.00 μH.

TABLE 1

| antenna | magnetic method | design value | | frequency band |
|---|---|---|---|---|
| | | inductance (μH) | resistance (Ω) | |
| first antenna | magnetic resonance | 1.30~1.65 | 0.40~0.60 | 6.78 MHz |
| second antenna | electromagnetic induction | 8.40~9.20 | 0.35~0.75 | 87 kHz~500 kHz |
| third antenna | MST | 15.70~18.00 | 0.32~1.50 | 10 kHz or under |

The connector 640 can be interconnected between the third antenna 630 and the controller 540. The connector 640 can control the connection between the second antenna 620 and the third antenna 630, and the controller 540. For doing so, the connector 640 can be interposed between the second antenna 620 and the controller 540 and between the third antenna 630 and the controller 540. The connector 640 can operate under control of the controller 540.

The connector 640 can include one or more switches 641 and 643, for example, a first connection switch 641 and a second connection switch 643 as shown in FIG. 7. The first connection switch 641 can be interposed between the second antenna 620 and the controller 540. The second connection switch 643 can be interposed between the third antenna 630 and the controller 540. Thus, when the third antenna 630 and the controller 540 are disconnected, the connector 640 can build a current path interconnecting the controller 540 and the first antenna 610 or a current path interconnecting the controller 540 and the second antenna 620. When the third antenna 630 and the controller 540 are connected, the connector 640 can build a current path interconnecting the controller 540, the second antenna 620, and the third antenna 630.

The magnetic field unit 510 can further include a noise reduction filter 710 as shown in FIG. 7. The noise reduction filter 710 can be interposed between the first antenna 610 and the second antenna 620. Alternatively, although not depicted, the noise reduction filter 710 can be interposed between the second antenna 620 and the controller 540. Hence, the noise reduction filter 710 can suppress noise inflow between the first antenna 610 or the second antenna 620 and the controller 540.

The controller 540 can perform interfacing through a magnetic field using at least one of the first antenna 610, the second antenna 620, and the third antenna 630. The controller 540 can wirelessly receive power using any one of the first antenna 610 and the second antenna 620. The controller 540 can perform communication through a magnetic field using the third antenna 630.

The controller 540 can use the first antenna 610 according to the first charging method, and use the second antenna 620 according to the second charging method. Hence, the controller 540 can receive the power over the first antenna 610 using the first charging method, and receive the power over the second antenna 620 using the second charging method. The first charging method can be the magnetic resonance method, and the second charging method can be the electromagnetic induction method. For example, the controller 540 can receive the power through the high frequency band $f_1$ using the magnetic resonance, and receive the power through the first low frequency band $f_{21}$ using the electromagnetic induction.

The controller 540 can use the second antenna 620 and the third antenna 630 according to the short-range communication method. Thus, the controller 540 can conduct the communication through a magnetic field using the second antenna 620 and the third antenna 630. The short-range communication method can be MST. For example, the controller 540 can perform MST using the second low frequency band $f_{22}$. The MST is a communication technology for offline payment using a magnetic field, and can be used to communicate with a POS device.

The controller 540 can include a first circuit unit and a second circuit unit. The first circuit unit can receive power over the first antenna 610 using the first charging method, and receive power over the second antenna 620 using the second charging method. The second circuit unit can perform the short-range communication using a magnetic field over the second antenna 620 and the third antenna 630.

Figure 8:
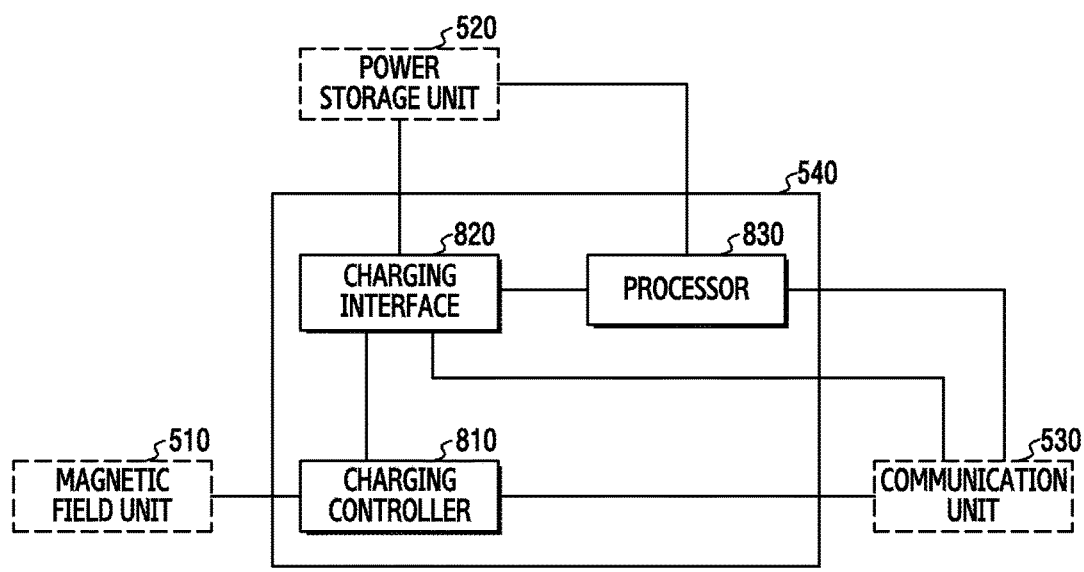
FIG. 8 is a block diagram of a controller, such as the controller of FIG. 5, according to an embodiment of the present disclosure.

FIG. 8 is a block diagram of a controller, such as the controller 540 of FIG. 5, according to an embodiment of the present disclosure.

Referring to FIG. 8, the controller 540 can include a charging controller 810, a charging interface 820, and a processor 830.

The charging controller 810 can receive and process power from the magnetic field unit 510. For example, the charging controller 810 can receive alternating current power from the magnetic field unit 510. The charging controller 810 can convert the alternating current power to direct current power.

The charging interface 820 can receive the power from the charging controller 810 and provide a power supply path. The charging interface 820 can provide the power supply path under control of the charging controller 810. The charging interface 820 can supply the power to at least one of the power storage unit 520 and the communication unit 530.

The processor 830 can perform various functions. For doing so, the processor 830 can receive and process commands or data from the components of the electronic device 420. For example, the processor 830 can be an application processor (AP).

Figure 9:
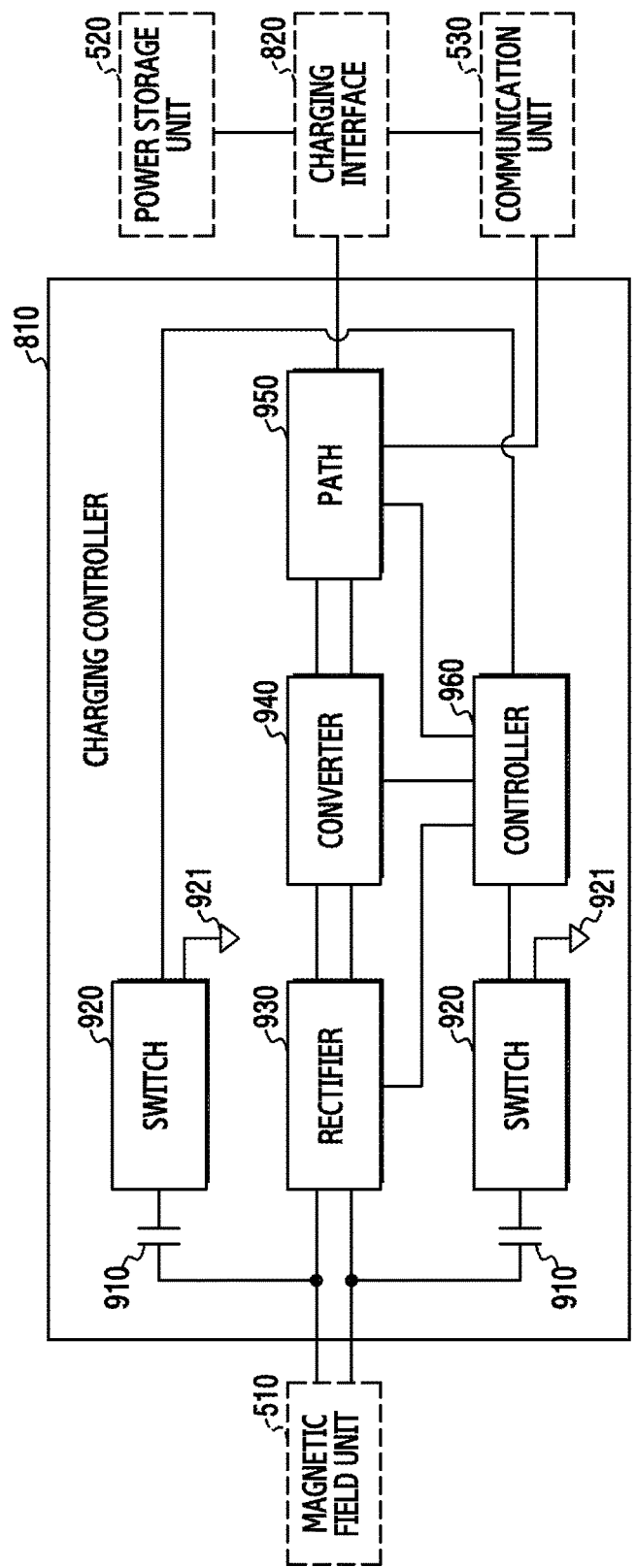
FIG. 9 is a block diagram of a charging controller, such as the charging controller of FIG. 8, according to an embodiment of the present disclosure.

FIG. 9 is a block diagram of a charging controller, such as the charging controller 810 of FIG. 8, according to an embodiment of the present disclosure.

Referring to FIG. 9, the charging controller 810 can include at least one capacitor 910, at least one switch 920, a rectifier 930, a converter 940, a path 950, and a power controller 960.

The capacitor 910 can be connected between the magnetic field unit 510 and the rectifier 930. The capacitor 910 can be drawn from between the magnetic field unit 510 and the rectifier 930. The capacitor 910 can be used to detect the electronic device 420. That is, the capacitor 910 can be disposed to detect the electronic device 420 in the external device 410. The capacitor 910 can be disposed to protect an internal circuit of the controller 540. That is, the capacitor 910 can build a ground circuit through discharging. For example, a capacitance C of the capacitor 910 can roughly correspond to 2.2 nF through 3.1 nF.

The switch 920 can be connected to the capacitor 910. The switch 920 can be connected to a ground 921. That is, the switch 920 can be interposed between the capacitor 910 and the ground 921. Hence, the switch 920 can interconnect the capacitor 910 and the ground 921, or disconnect the capacitor 910 from the ground 921. As the switch 920 interconnects the capacitor 910 and the ground 921, the capacitor 910 can serve as the ground circuit.

The rectifier 930 can receive the alternating current power from the magnetic field unit 510. The rectifier 930 can rectify the alternating current power to the direct current power. For example, the rectifier 930 can be implemented as a bridge diode. An input voltage can be equal to an output voltage in the rectifier 930.

The converter 940 can receive the direct current power from the rectifier 930. The converter 940 can convert the direct current power according to a preset gain. The converter 940 can convert an input voltage to an output voltage of a preset value. For example, the converter 940 can convert the direct current power so that the output voltage becomes 5 V.

The path 950 can receive the current power from the converter 940. The path 950 can provide the direct current power to at least one of the charging interface 820 and the communication unit 530.

The power controller 960 can control the operations in the charging controller 810. The power controller 960 can control the components of the charging controller 810.

According to various embodiments, the power controller 960 can drive the capacitor 910. For example, in a charging standby mode, the power controller 960 can build the ground circuit with the capacitor 910. For doing so, the power controller 960 can turn on the switch 920 and connect the capacitor 910 to the ground 921. Hence, the capacitor 910 can be discharged. When the power is received from the magnetic field unit 510, the capacitor 910 can generate a resonance. For doing so, the power controller 960 can keep the switch 920 on for a preset time duration from the power reception. For doing, in a charging driving mode, the power controller 960 can keep the switch 920 on. Thus, the external device 410 can detect the electronic device 420.

According to various embodiments, when a preset time duration passes from the power reception, the power controller 960 can stop driving the capacitor 910. For example, in a power receiving mode, the power controller 960 can turn off the switch 920 and disconnect the capacitor 910 from the ground 921. The power controller 960 can receive the power from the magnetic field unit 510 and process the power through the rectifier 930 and the converter 940. The power controller 960 can control the path 950 to supply the power to at least one of the charging interface 820 and the communication unit 530. The power controller 960 can temporarily turn on the switch 920. Hence, the capacitor 910 can be discharged. As a result, the internal circuit of the charging controller 810 can be protected.

An electronic device 420 can include one or more antennas 610 and 620 for wirelessly receiving power, a controller 540 for controlling the power, and at least one capacitor 910 for protecting the controller from the power 540.

The controller 540 can drive the capacitor 910, detect the power received via the antenna 610 or 620, and stop driving the capacitor 910.

The controller 540 can continuously drive the capacitor 910 during a preset time duration from the power detected time.

When the capacitor 910 keeps driving, the capacitor 910 can produce a resonance based on the power received via the antenna 610 or 620.

When a frequency band of the power corresponds to a preset frequency band, the controller 540 can continuously drive the capacitor 910 during a preset time duration from the power detected time.

When the frequency band of the power deviates from the preset frequency band, the controller 540 can stop driving the capacitor 910.

The preset frequency band can include a frequency band for electromagnetic induction.

When the capacitor 910 stops driving, the controller 540 can detect an error from the power received via the antenna 610 or 620 and re-drive the capacitor 910.

When re-driving the capacitor 910, the controller 540 can detect a solution to the error in the power received via the antenna 610 or 620, and re-stop driving the capacitor 910.

The electronic device 420 can further include the switch 920 for connecting the capacitor 910 to the ground 921 in order to drive the capacitor 910 and disconnecting the capacitor 910 from the ground 921 in order to stop driving the capacitor 910.

The electronic device 420 can support a plurality of charging methods.

A recording medium can record a program for driving a capacitor 910 which protects an internal circuit, detecting power received, and stopping driving the capacitor 910.

Figure 10:
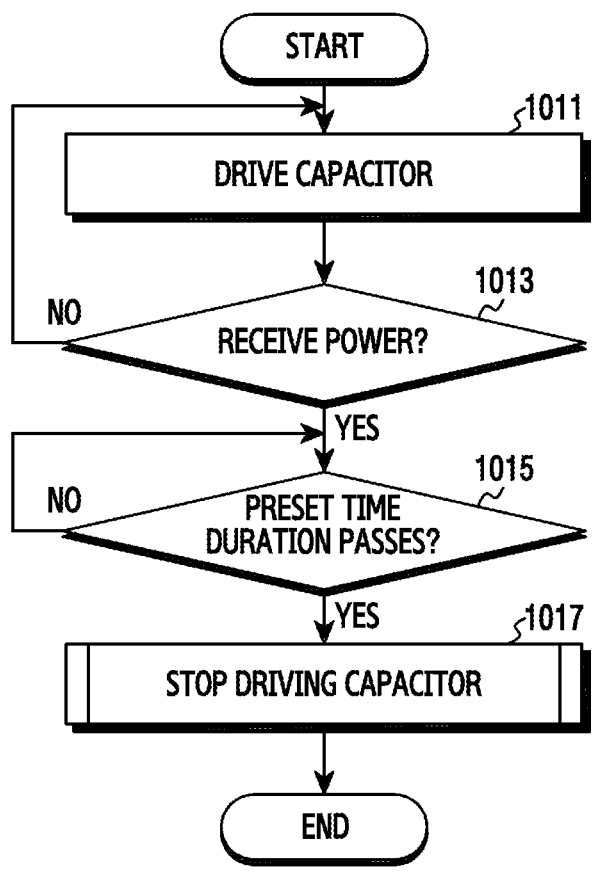
FIG. 10 is a flowchart of an operating method of an electronic device according to an embodiment of the present disclosure.

FIG. 10 is a flowchart of an operating method of an electronic device according to an embodiment of the present disclosure.

Referring to FIG. 10, in operation 1011, the power controller 960 can drive the capacitor 910. For example, in the charging standby mode, the power controller 960 can build the ground circuit with the capacitor 910. For doing so, the power controller 960 can turn on the switch 920 and thus connect the capacitor 910 to the ground 921. Hence, the capacitor 910 can be discharged.

When receiving power while driving the capacitor 910 in operation 1011, the power controller 960 can detect the power reception in operation 1013. In so doing, the external device 410 can transfer power in order to detect the electronic device 420. Thus, the power controller 960 can receive the power from the magnetic field unit 510 while driving the capacitor 910. The power controller 960 can enter the charging driving mode from the charging standby mode.

In operation 1015, the power controller 960 can determine whether a preset time duration passes. When receiving the power, the power controller 960 can count the time. The power controller 960 can determine whether the preset time duration passes from the power reception. For example, the preset time duration can correspond to about 1 ms. For the preset time duration from the power reception, the power controller 960 can continuously drive the capacitor 910. For example, in the charging driving mode, the power controller 960 can keep the switch 920 on.

The capacitor 910 can generate the resonance. That is, as the capacitor 910 is discharged, the power can be supplied from the magnetic field unit 510 to the capacitor 910. Hence, the capacitor 910 can generate the resonance through the ground circuit. During the preset time duration from the power reception, the capacitor 910 can generate the resonance. For example, the capacitor 910 can generate the resonance at 1 MHz. Hence, the external device 410 can detect the electronic device 420.

When the preset time duration passes in operation 1015, the power controller 960 can stop driving the capacitor 910 in operation 1017. For example, in the power receiving mode, the power controller 960 can turn off the switch 920 and disconnect the capacitor 910 from the ground 921. The power controller 960 can temporarily turn on the switch 920. Thus, the capacitor 910 can be discharged. As a result, the internal circuit of the charging controller 810 can be protected.

The power controller 960 can receive the power from the magnetic field unit 510 and process the power through the rectifier 930 and the converter 940. The power controller 960 can control the path 950 to supply the power to at least one of the charging interface 820 and the communication unit 530. In so doing, the power controller 960 can provide the power to the charging interface 820 and store the power in the power storage unit 520. The power controller 960 can send charging status information to the communication unit 530. For example, the charging status information can include at least one of the input voltage, the output voltage, the output current of the power corresponding to the power controller 960, and a temperature of the power controller 960. The power controller 960 can send the charging status information to the communication unit 530 through an I$^2$C interface. Upon receiving the charging status information, the communication unit 530 can generate an operation signal based on the charging status information. The communication unit 530 can send the operation signal to the external device 410. For example, the operation signal can include a value of at least one parameter for the wireless charge.

Figure 11:
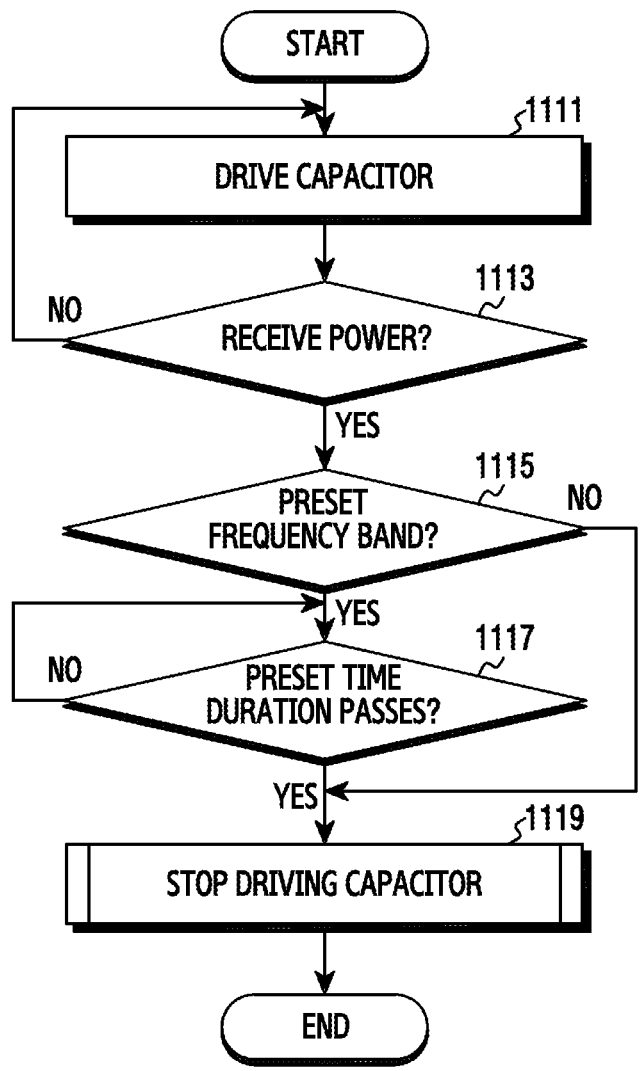
FIG. 11 is a flowchart of an operating method of an electronic device according to an embodiment of the present disclosure.

FIG. 11 is a flowchart of an operating method of an electronic device according to an embodiment of the present disclosure.

Referring to FIG. 11, the power controller 960 can drive the capacitor 910 in operation 1111. For example, in the charging standby mode, the power controller 960 can build the ground circuit with the capacitor 910. For doing so, the power controller 960 can turn on the switch 920 and connect the capacitor 910 to the ground 921. Hence, the capacitor 910 can be discharged.

When receiving power while driving the capacitor 910 in operation 1111, the power controller 960 can detect the power reception in operation 1113. In so doing, the external device 410 can transfer power in order to detect the electronic device 420. Thus, the power controller 960 can receive the power from the magnetic field unit 510 while driving the capacitor 910. The power controller 960 can enter the charging driving mode from the charging standby mode.

In operation 1115, the power controller 960 can determine whether the frequency band of the power corresponds to a preset frequency band. For example, the power controller 960 can determine whether the power frequency band corresponds to the low frequency band f$_{21}$.

When the power frequency band corresponds to the preset frequency band in operation 1115, the power controller 960 can determine whether the preset time duration passes in operation 1117. Upon receiving the power, the power controller 960 can count the time. The power controller 960 can determine whether the preset time duration passes from the power reception. For example, the preset time duration can correspond to about 1 ms. For the preset time duration from the power reception, the power controller 960 can continuously drive the capacitor 910. For example, in the charging driving mode, the power controller 960 can keep the switch 920 on.

The capacitor 910 can generate the resonance. That is, as the capacitor 910 is discharged, the power can be supplied from the magnetic field unit 510 to the capacitor 910. Hence, the capacitor 910 can generate the resonance through the ground circuit. The capacitor 910 can generate the resonance during the preset time duration from the power reception. For example, the capacitor 910 can generate the resonance at 1 MHz. Thus, the external device 410 can detect the electronic device 420.

When the preset time duration passes in operation 1117, the power controller 960 can stop driving the capacitor 910 in operation 1119. For example, in the power receiving mode, the power controller 960 can turn off the switch 920 and disconnect the capacitor 910 from the ground 921. The power controller 960 can receive the power from the magnetic field unit 510 and process the power through the rectifier 930 and the converter 940. The power controller 960 can control the path 950 to supply the power to at least one of the charging interface 820 and the communication unit 530. The power controller 960 can temporarily turn on the switch 920. Hence, the capacitor 910 can be discharged. As a result, the internal circuit of the charging controller 810 can be protected.

When the power frequency band does not correspond to the preset frequency band in operation 1115, the power controller 960 can stop driving the capacitor 910 in operation 1119. For example, in the power receiving mode, the power controller 960 can turn off the switch 920 and disconnect the capacitor 910 from the ground 921. The power controller 960 can temporarily turn on the switch 920. Hence, the capacitor 910 can be discharged. As a result, the internal circuit of the charging controller 810 can be protected.

The power controller 960 can receive the power from the magnetic field unit 510 and process the power through the rectifier 930 and the converter 940. The power controller 960 can control the path 950 to supply the power to at least one of the charging interface 820 and the communication unit 530. In so doing, the power controller 960 can provide the power to the charging interface 820 and store the power in the power storage unit 520. The power controller 960 can send charging status information to the communication unit 530. For example, the charging status information can include at least one of the input voltage, the output voltage, the output current of the power corresponding to the power controller 960, and the temperature of the power controller 960. The power controller 960 can send the charging status information to the communication unit 530 through an I$^2$C interface. Upon receiving the charging status information, the communication unit 530 can generate an operation signal based on the charging status information. The communication unit 530 can send the operation signal to the external device 410. For example, the operation signal can include a value of at least one parameter for the wireless charge.

Figure 12:
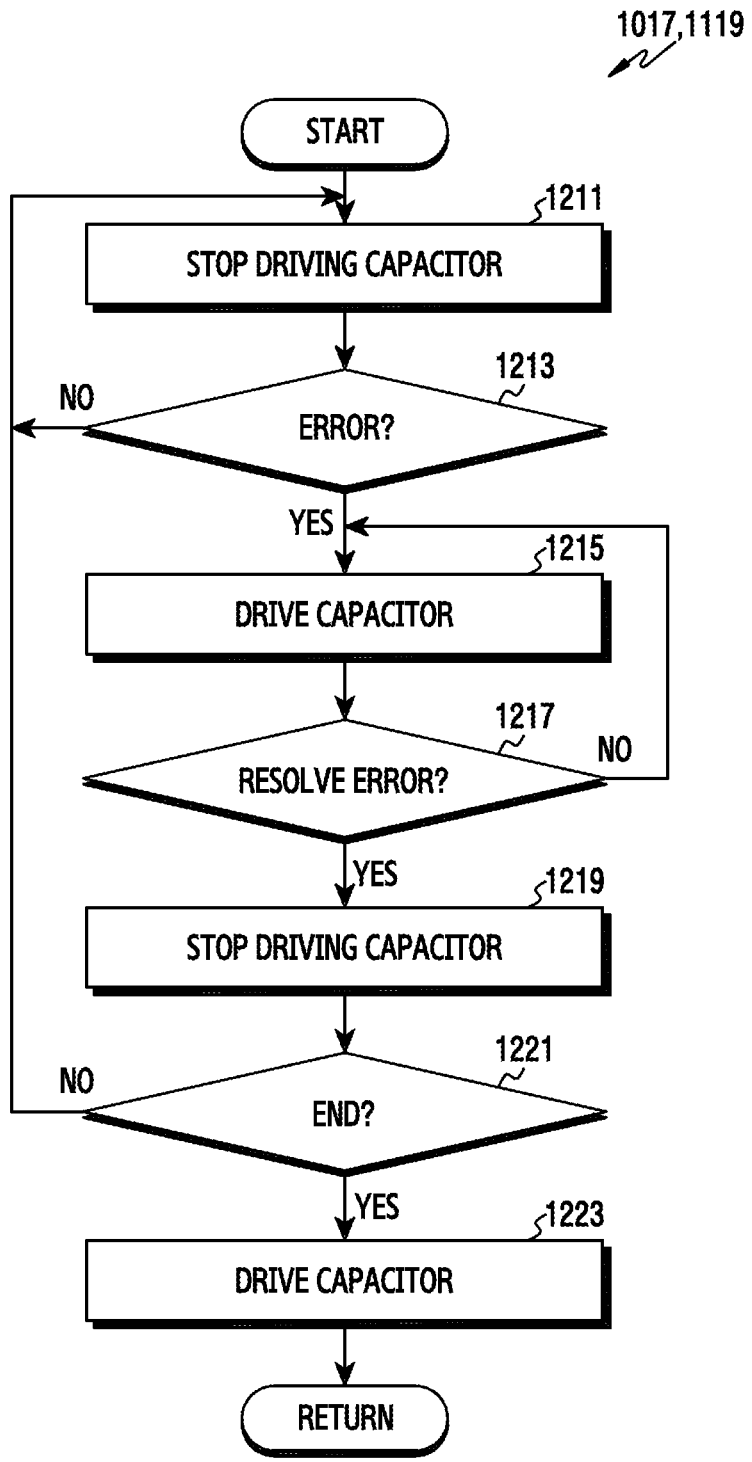
FIG. 12 is a flowchart of a method for stopping driving of a capacitor, for example the capacitor illustrated in FIG. 10 and FIG. 11, according to an embodiment of the present disclosure.

FIG. 12 is a flowchart of a method for stopping driving of a capacitor, for example the capacitor illustrated 910 in FIG. 10 and FIG. 11, according to an embodiment of the present disclosure.

Referring to FIG. 12, the power controller 960 can stop driving the capacitor 910 in operation 1211. For example, the power controller 960 can turn off the switch 920 and disconnect the capacitor 910 from the ground 921.

When an error occurs during the power reception, the power controller 960 can detect the error in operation 1213. For example, the error can result from overvoltage during the power reception. For example, the power controller 960 can drive the capacitor 910 in operation 1215. For example, the power controller 960 can build the ground circuit with the capacitor 910. For doing so, the power controller 960 can turn on the switch 920 and connect to the capacitor 910 to the ground 921. Hence, as the capacitor 910 is discharged, the power is supplied from the magnetic field unit 510 to the capacitor 910.

During the driving of the capacitor 910 in operation 1215, the power controller 960 can determine whether the error is resolved in operation 1217. For example, the power controller 960 can determine whether the overvoltage is resolved during the power reception. When the error is resolved in operation 1217, the power controller 960 can stop driving the capacitor 910 in operation 1219. For example, the power controller 960 can turn off the switch 920 and disconnect the capacitor 910 from the ground 921.

When the power reception ends, the power controller 960 can detect the power reception end in operation 1221. That is, when not receiving the power from the magnetic field unit 510, the power controller 960 can detect the power reception end. In operation 1223, the power controller 960 can drive the capacitor 910. For example, the power controller 960 can build the ground circuit with the capacitor 910. For doing so, the power controller 960 can turn on the switch 920 and connect the capacitor 910 to the ground 921.

When the power reception does not end in operation 1221, the power controller 960 can return to operation 1211. Next, the power controller 960 repeats the operations 1211 through 1221.

An operating method of an electronic device 420 including a capacitor 910 for protecting an internal circuit from power received, can include driving the capacitor 910, detecting the received power, and stopping driving the capacitor 910.

The operating method of the electronic device 420 can further include continuously driving the capacitor 910 during a preset time duration from the power detected time.

Continuously driving the capacitor 910 can include producing a resonance in the capacitor 910 based on the received power.

Continuously driving the capacitor 910 can include, when a frequency band of the power corresponds to a preset frequency band, continuously driving the capacitor 910 during a preset time duration from the power detected time.

Continuously driving the capacitor 910 can include, when the frequency band of the power deviates from the preset frequency band, stopping driving the capacitor 910.

The preset frequency band can include a frequency band for electromagnetic induction.

The operating method of the electronic device 420 can further include, when the capacitor 910 stops driving, detecting an error from the received power and re-driving the capacitor 910.

The operating method of the electronic device 420 can further include, when re-driving the capacitor 910, detecting a solution to the error in the received power and re-stopping driving the capacitor 910.

Driving the capacitor 910 can include connecting the capacitor 910 to a ground 921.

Stopping driving the capacitor 910 can include disconnecting the capacitor 910 from the ground 921.

As set forth above, for the external device 410 to detect the electronic device 420, the electronic device 420 can use the capacitor 910 for protecting its internal circuit. The electronic device 420 can utilize the single antenna 620 for both of the wireless charging and the magnetic field communication. Therefore, the plurality of the wireless charging methods or the wireless charging method and the magnetic field communication method can be used together in the electronic device 420.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus of an electronic device, the apparatus comprising:
   at least one antenna configured to wirelessly receive power;
   a controller configured to control the power; and
   at least one capacitor configured to protect the controller from the power,
   wherein the controller is further configured to:
      drive the at least one capacitor,
      detect the power received via the at least one antenna, and
      stop driving the at least one capacitor.

2. The apparatus of claim 1, wherein the controller is further configured to continuously drive the at least one capacitor during a preset time duration after detecting the power.

3. The apparatus of claim 2, wherein, when the at least one capacitor keeps driving, the at least one capacitor is further configured to generate a resonance based on the power received via the at least one antenna.

4. The apparatus of claim 2, wherein, when a frequency band of the power corresponds to a preset frequency band, the controller is further configured to continuously drive the at least one capacitor during the preset time duration after detecting the power.

5. The apparatus of claim 4, wherein, when the frequency band of the power deviates from the preset frequency band, the controller is further configured to stop driving the at least one capacitor.

6. The apparatus of claim 4, wherein the preset frequency band comprises a frequency band for electromagnetic induction.

7. The apparatus of claim 1, wherein, when the at least one capacitor stops driving, the controller is further configured to detect an error from the power received via the at least one antenna and re-drives the at least one capacitor.

8. The apparatus of claim 7, wherein, when re-driving the at least one capacitor, the controller is further configured to:
   detect a solution to the error in the power received via the at least one antenna, and
   re-stop driving the at least one capacitor.

9. The apparatus of claim 1, further comprising:
   a switch configured to:
      connect the at least one capacitor to a ground in order to drive the at least one capacitor, and
      disconnect the at least one capacitor from the ground in order to stop driving the at least one capacitor.

10. The apparatus of claim 1,
   wherein the controller is further configured to control the at least one antenna to receive the power based on a wireless charging method, and
   wherein the wireless charging method comprises at least one of an electromagnetic induction method, a magnetic resonance method, or an RF/microwave radiation method.

11. An operating method of an electronic device which comprises a capacitor for protecting an internal circuit from power received, the method comprising:
driving the capacitor;
detecting the received power; and
stopping driving the capacitor.

12. The operating method of claim 11, further comprising:
continuously driving the capacitor during a preset time duration after detecting the received power.

13. The operating method of claim 12, wherein the continuously driving of the capacitor comprises:
generating a resonance in the capacitor based on the received power.

14. The operating method of claim 12, wherein the continuously driving of the capacitor comprises:
when a frequency band of the power corresponds to a preset frequency band, continuously driving the capacitor during the preset time duration after detecting the received power.

15. The operating method of claim 14, wherein the stopping driving of the capacitor comprises:
when the frequency band of the power deviates from the preset frequency band, stopping driving the capacitor.

16. The operating method of claim 14, wherein the preset frequency band comprises a frequency band for electromagnetic induction.

17. The operating method of claim 11, further comprising:
when the capacitor stops driving, detecting an error from the received power; and
re-driving the capacitor.

18. The operating method of claim 17, further comprising:
when re-driving the capacitor, detecting a solution to the error in the received power; and
re-stopping driving the capacitor.

19. The operating method of claim 11, wherein the driving of the capacitor comprises:
connecting the capacitor to a ground, and
stopping driving the capacitor comprises:
disconnecting the capacitor from the ground.

20. A non-transitory computer-readable recording medium which records a program for driving a capacitor to:
protect an internal circuit;
detect power received; and
stop driving the capacitor.

* * * * *